United States Patent [19]

Avakian et al.

[11] 3,870,385

[45] Mar. 11, 1975

[54] INTERCONNECTING SYSTEMS AND DEVICES USING CONDUCTIVE ELASTOMER PELLETS IN PLANAR COMPONENT SUPPORTING STRUCTURES AND IN ELECTRONIC CIRCUIT CONNECTORS

[75] Inventors: Emik Avakian, 92 Juana St., Crestwood, N.Y. 10707; David Laizerovich, Manchester, Conn.

[73] Assignee: said Avakian, by said Laizerovich

[22] Filed: Sept. 10, 1973

[21] Appl. No.: 395,393

[52] U.S. Cl. .................. 339/48, 174/68.5, 317/101, 339/18 R, 339/17 E, 339/118 R

[51] Int. Cl. .......................... H01r 9/00, H05k 1/02

[58] Field of Search ................. 200/166 C; 338/114; 339/17, 18, 116–118, 94, 96, 61, 19, 59, 154, 156, 48, 49 B, 103, 107, 247, 198, 95 R, 95 D; 174/68.5; 317/101 C, 101 CC

[56] References Cited

UNITED STATES PATENTS

| | | | |
|---|---|---|---|
| 2,935,722 | 5/1960 | Kacin | 339/118 R |
| 3,064,229 | 11/1962 | Dee et al. | 339/118 R |
| 3,127,230 | 3/1964 | Marquis et al. | 339/118 R |
| 3,158,420 | 11/1964 | Olson et al. | 339/96 |
| 3,191,100 | 6/1965 | Sorvillo | 339/17 E X |
| 3,456,232 | 7/1969 | Dupre | 339/96 |
| 3,648,002 | 3/1972 | Du Rocher | 200/166 C |
| 3,680,037 | 7/1972 | Nellis et al. | 339/61 M |

OTHER PUBLICATIONS

IBM Technical Disclosure Bulletin, Vol. 7, No. 1, 06–1964, p. 101 "Solderless Electrical Contacts" Miller and Mores

*Primary Examiner*—Roy D. Frazier
*Assistant Examiner*—Terrell P. Lewis
*Attorney, Agent, or Firm*—Charles A. Warren

[57] ABSTRACT

An interconnecting system and devices for use in electronic interconnections, the connector having resilient conductive elements embedded in a board. On one surface of the board there are a plurality of ridges with the elements uniformly spaced along the ridges, and with the ridges intersected by notches to receive wires the ends of which are embedded in the resilient conductive elements with the wires positioned between the ridges and below the top surface of the board. Such systems and devices shall serve to connect and facilitate the modification of interconnections between component terminals. When the resilient conductive elements are allowed to protrude from one of the surfaces of the board, two such boards can form mating connectors, each having identical structures.

18 Claims, 5 Drawing Figures

INTERCONNECTING SYSTEMS AND DEVICES USING CONDUCTIVE ELASTOMER PELLETS IN PLANAR COMPONENT SUPPORTING STRUCTURES AND IN ELECTRONIC CIRCUIT CONNECTORS

BACKGROUND OF THE INVENTION

In making electrical connectors and supporting components in recent years, wire-wrap boards are coming into greater use. They allow dense packing of components, which can be connected to posts, and these posts in turn can be randomly interconnected with many wires overlapping each other. Such density of components can only be achieved in printed circuit technology by using multilayer printed circuits which are very expensive to fabricate and do not allow for modifications.

In another area, cables and circuit boards are interconnected by mating differentiated pins, male and female, in connectors. Such connectors, as well as the wire-wrap connection to pins, allow at best a limited number of interconnecting points for electrical conduction. The points of contact have been bifurcated to aid in increasing the number of contact points. When wire-wrap techniques are used the wire comes in intimate contact with the post only at the corners of these posts. While conductive elastomer material has been used to achieve large-surface contacts between such material and metallic surfaces of components, this has been done by committing the elastomer material to connect given pre-established points of two circuits such as connecting small display elements to circuits used in wristwatches. Conductive elastomer material has also been embedded in given interconnecting boards, but such circuits have been completely committed to a given circuit configuration, making no allowance for random connections between circuit elements or the modifications of such interconnections.

STATEMENT OF THE INVENTION

The present invention contemplates an interconnecting device for use as a connector or a component support structure in which the connections are made directly with conductive elements arranged within the device in a preselected pattern to receive and make connection with wires or with the projecting pins on an electronic component without preforming of the connective element merely by the insertion of the wire or pins into the element or elements.

According to the present invention the pins are omitted and a plurality of small slugs or conductors of resilient conductive material are positioned in spaced relation in each of several parallel rows of holes in a planar device. These rows of conductors form a network in a selected pattern to accept the pins of components or multiple connections such as dual-in-line plugs, or the ends of individual connecting wires and the conductive elastomer making up the conductors having such a consistency as to receive and make contact with the pins or wires without the need for preformed holes therein.

One surface of the board, in one concept, has spaced parallel ridges coinciding with the rows of holes and these ridges are divided by spaced notches intersecting the bores in which the slugs are positioned. These notches accept and retain connecting wires, the ends of which are pierced into the slugs and make contact therewith. The invention contemplates that each of the slugs can receive a plurality of wires and the notches will accept the several wires and the grooves between the ridges will receive and guide the wires to other slugs in the board. The spacing of the holes is such that they will receive the pins on multiple devices, such pins being received in elastomer of the slugs and making contact therewith without preformed holes in the slug. In the preferred embodiment the conductive elastomer is "self-healing" so that the holes disappear when the pins or wires are withdrawn.

The invention also contemplates the use of a pair of these interconnecting devices in back-to-back relation, and to this end the slugs are positioned in the device to extend beyond the back surface thereof, so that the slugs of the pair of matrices, in back-to-back position, will be in contact and thus establish electrical contact between the slugs of the pair of boards.

This invention is, in certain respects, an improvement in the device of my copending application Set. No. 337,838 filed Mar. 5, 1973 in that the connector elements are contained essentially within the opposite surfaces of the board or device and may accept connecting wires or pins without preformed holes. Further, the connector buttons of said application are for use with printed circuitry where the interconnection of the connectors is committed by the circuitry. The present application contemplates random or selected connections that may be modified at will, thus, in a noncommited structure.

Other features and advantages will be apparent from the specification and claims and from the accompanying drawings which illustrate an embodiment of the invention.

DESCRIPTION OF THE PREFERRED EMBODIMENT

Figure 1:
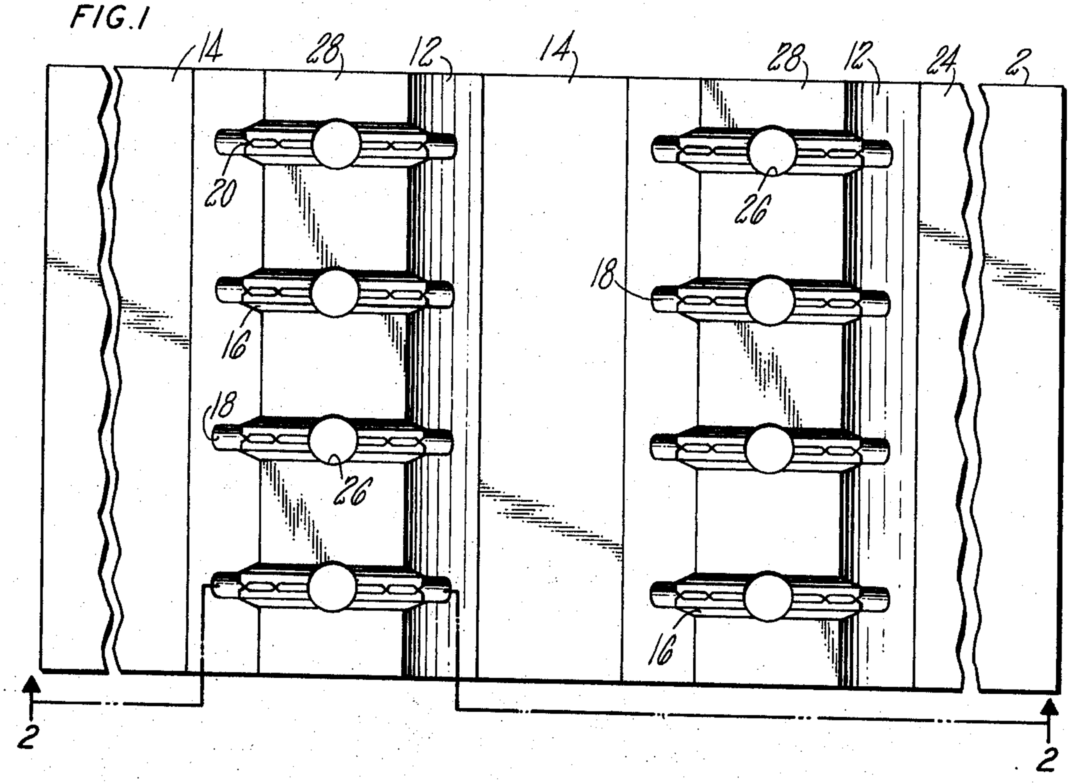
FIG. 1 is a plan view of the matrix or board.

Referring first to FIG. 1, the invention is in the form of a planar device or board 10 having a plurality of spaced parallel ridges 12 on the top thereof. These ridges are spaced apart 0.330 inches to establish therebetween the convention spacing of the sets of pins as a dual-in-line plug or pins of connectors.

Figure 3:
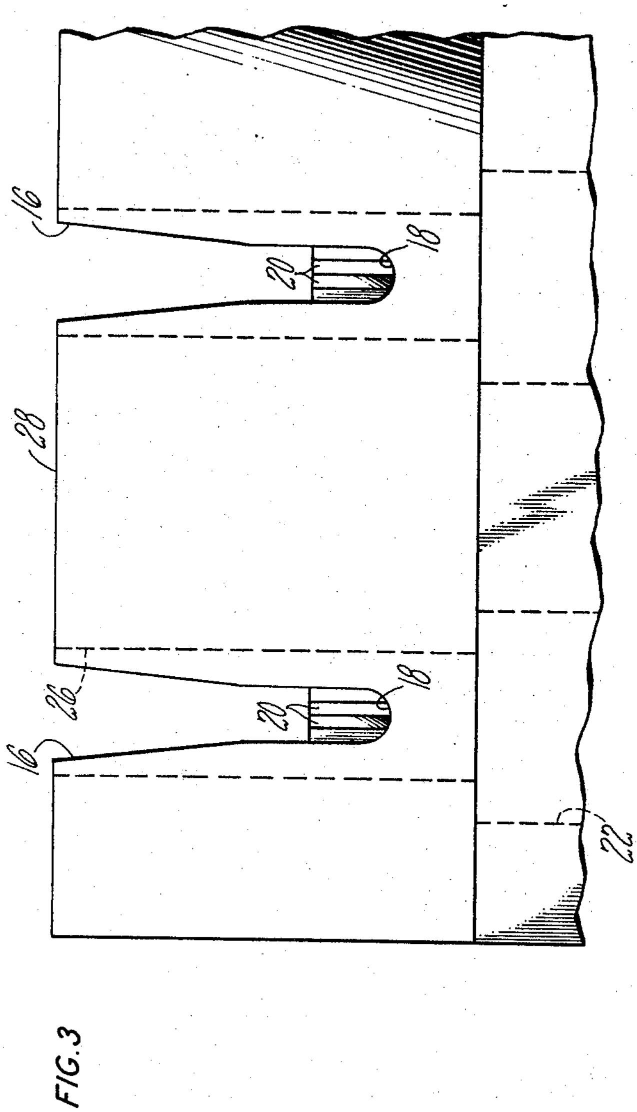
FIG. 3 is a side elevation of FIG. 1 on a larger scale.
Figure 4:
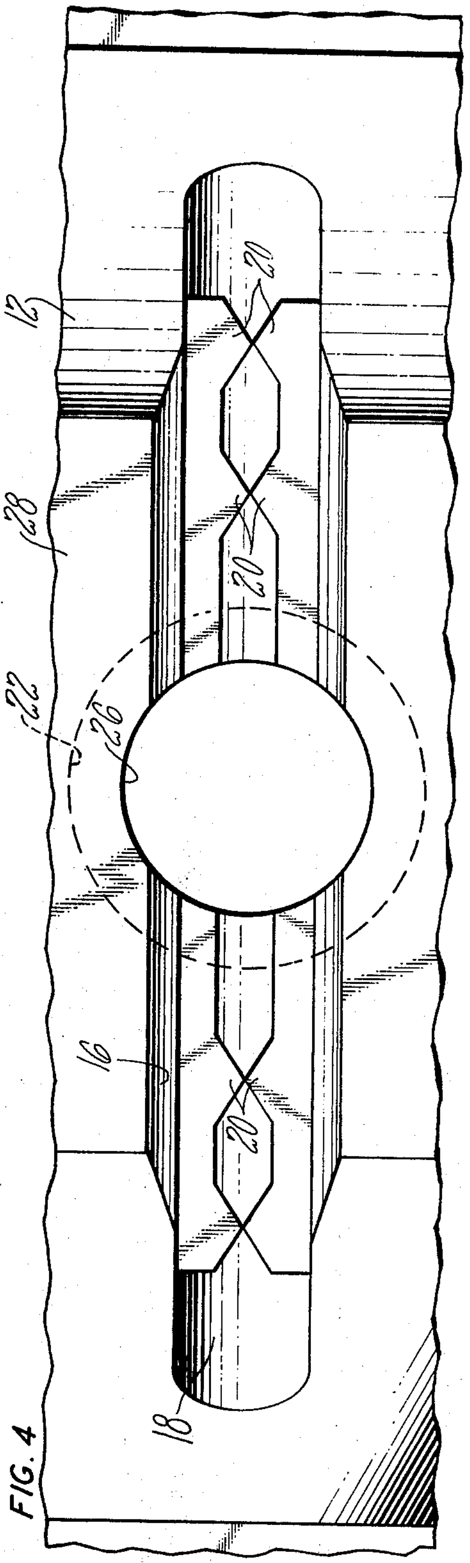
FIG. 4 is a fragmentary plan view of a portion of FIG. 1 to show various details.

Each ridge has a plurality of transverse notches 16 of FIG. 3 therein the spacing of which are 0.100 inches to correspond to the spacing of the pins in each set of a dual-in-line plug or pins of other connectors or components. The side walls of these notches 14 are steep, for example, about 75° to the plane of the device as shown. Each notch terminates at the base in a horizontal U-shaped passage 18 which will receive the connecting wires as later described. Within the passage 18 are a plurality of teeth 20 extending from the side walls and abutting one another to serve as a resilient retainer for the wires when located in the passages. The notches break up each ridge into a plurality of pyramids located between adjacent notches.

Extending into the device from the bottom surface 21 are a plurality of rows of vertical openings 22, each row of openings coinciding with one of the ridges 12 on the top of the matrix, and with the openings in each row located to coincide with the notches 16 in the ridges. These openings extend upwardly into the device substantially to the plane of the bases 24 of the grooves 14.

Communicating with the openings 22 are cooperating openings 26 coaxial with the openings 22 and extending downwardly from the tops 28 of the ridges 12 to intersect the openings 22. The openings 26 are smaller in diameter than the openings 22 to establish a locating shoulder 30 in each vertical passage defined by the coaxial openings, this shoulder being substantially in the plane of the bottoms 24 of the grooves 14.

The openings 26 are larger in diameter than the width of the notches 16 at the tops 28 of the ridges and are also larger in diameter than the horizontal passages 18 as shown in FIG. 3. As clearly shown, the horizontal passages 18 are parallel to and spaced above the surfaces 24 of the bottoms of the grooves and thus above the shoulders 30.

Figure 2:
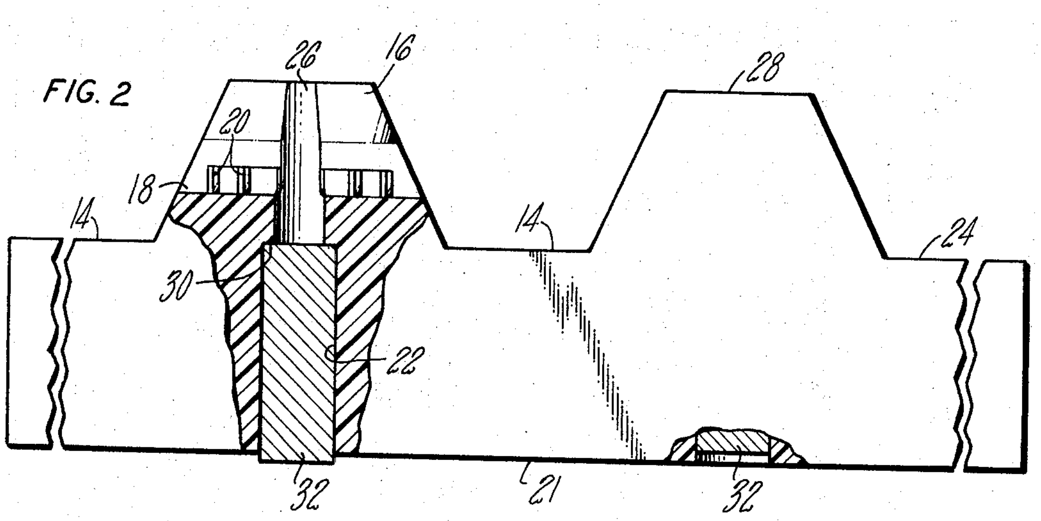
FIG. 2 is a side elevation, partly in section along line 2—2 of FIG. 1.

After the device is formed as described, being made of any of the suitable dielectric materials well known in the art, for example, some nylons are effective, slugs 32 of a resilient conductive material as described in my above identified copending application Ser. No. 337,838, are positioned in the openings 22, being located therein by contact with the shoulder 30. These slugs 32, for the connector application, are preferably slightly longer than the opening 22 and in this event project beyond the bottom surface of the device as shown in FIGS. 2 and 3 for contact with a cooperating device placed back-to-back with the device shown.

The material of the slugs 32 is such that it may be pierced freely by the small diameter wire used in connecting electronic board circuitry, (30 gage) without bending the wire and, once the wire end is within the slug, an effective and continuous surface contact, and thus a good electrical connection is made therewith by the nature of the material of the slug. Such wires are pushed down from the top of the board through the openings 26, and, once the bare wire end 34 has pierced the slug and is well embedded therein, the adjacent portion 26 of the wire is bent into the intercommunicating notch 16 and, as by a screwdriver, pressed between the teeth 20 in the horizontal passage 18. This brings the wire out into grooves 14 so that it may be extended in the groove to the edge of the board and thence to an electrical connection wherein desired. To this extent, the wires are positioned between the opposite surfaces of the device.

One form of elastomer for use is a fluorsilicone or silicone elastomer with continuously contacting particles of a conductive material embedded therein. One form is the silastic rubbers made by Dow Chemical Co. Other forms are the material sold as XECON made by METEX Corp. or CONSIL made by Technical Wire Products, Inc. In any event the material shoild be of a consistency and composition as to be self-healing so that the holes made by small diameter wires or pins will be filled up when the wire or pin is withdrawn.

Such materials will also desirably have the characteristic of retaining the wire or pin therein so that a deliberate pull is necessary for removal. This material makes a positive and extensive electrical contact over a considerable area of the wire or pin and thus assures a satisfactory electrical connection. The wires, even of small gage will penetrate the slug readily and may be inserted therein by hand without undesirable bending of the wire. The invention contemplates the idea of inserting the wire by a suitable tool for insertion in the slug, and this tool may be adapted for heating the wire for hot insertion.

The slugs may be retained within the device by making the slug slightly larger in cross sectional area than the hole that receives it, or the slug may be held by an adhesive. It is desirable to have the attachment such that withdrawal of a multiple pinned component from the underside of the device will not withdraw the slugs. In the arrangement shown the slugs are 0.062 inches in diameter and the hole in which they are received is 0.057 inches and are thus under compression when inserted. This compression serves to hold the wires or pins so as to require a deliberate pull for removal.

If the device is manufactured by a molding technique, a two-step process will permit forming the device in one step with the holes and ridges therein in one operation, and insertion of the slugs in the second step. To this end, the holes 22 and slugs therein are both a constant cross sectional dimension and shape and the elastomer of the slugs will be such that they retain themselves in the device. The holes to receive the slugs could be made rough or have ridges in step 1 so that when the holes are loaded with the elastomer material in step 2, they will cooperate with these ridges to secure the elastomer material within the holes.

The dimension of the opening 26 is selected to permit easy insertion of the bare end of the wire into the slug and then bending the adjacent portion into the horizontal opening 18 and the latter will accept a plurality of wires at each slug. With the spacing of the ridges 12 and notches 16 therein, such conventional electronic components as a dual-in-line plug may be inserted from the bottom of the device and the sets of pins on the plug will be received in the slugs in adjacent ridges, with the pins in each set received in adjacent slugs in each ridge.

By making appropriate wiring for each of a pair of boards or matrices, and subsequent assembly of the pair of boards in back-to-back relation an assemblage of subcircuits may be created with a minimum of effort. The insertion of the bare wire ends and the positioning of the adjacent portion of each connecting wire into the horizontal passage is readily accomplished and a positive electrical connection is thus established. The expert in microcircuitry will readily envision a multiplicity of uses for such devices where each of the devices are prepared separately and laid back to back to form proper interconnections between them.

It will be understood that the extent of the slug projection can be easily established to assure a positive electrical connection between the slugs in adjacent circuits when the backs or bottoms of the pair of boards are in contact, the clamping of the boards together compressing the slugs enough to assure positive contact but without so much pressure as to distort the boards in any way or compressing the slugs to the extent that they lose their elasticity. Thus the surfaces 21 will act as "compression stops."

Figure 5:
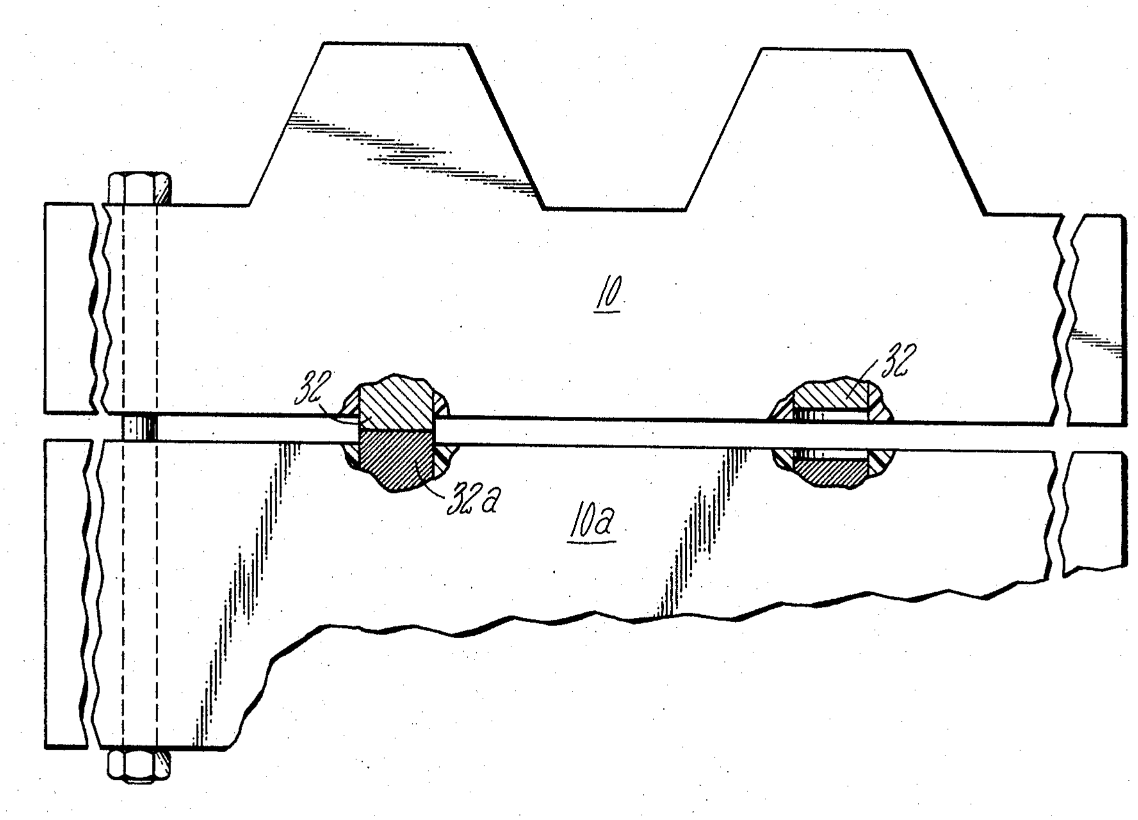
FIG. 5 is a side elevation similar to FIG. 2 showing two boards in use.

In addition to using the device itself as a connector, the devices may be placed back-to-back as in FIG. 5. To this end the board 10 is placed back to back with a similar board 10*a* with the slugs in board 10 contacting the mating boards where electrical contact is desired since the slugs normally project beyond the bottom surfaces 21 and 21*a*. The boards are shown in slightly spaced relation but are brought into contact with one another thereby compressing the elastomer of the slugs 32 and 32*a*. Clamping may be in any suitable way as by clamping bolts 34 extending through the boards.

Where electrical contact is not desirable between opposed slugs, such slugs are recessed below the bottom board surfaces as shown in the plugs 36 and 36*a* in FIG. 5. With this arrangement the slugs will be out of engagement and no electrical connection will occur.

In its simplest concept, the device may be made without the grooves and notches if it is unnecessary to position the wires below the top surface. It is also contemplated that the device may be sized for a larger number of connections or may be of such a size that it will have only the number of slugs to correspond to the multiple connecting pins on a multiple element component. The device may be used to make an interconnection between two components on opposite sides of the device since the top openings will also receive the projecting pins thereon to be embedded in the slug.

It should be understood that the invention is not limited to the particular embodiments shown and described herein, but that various changes and modifications may be made without departing from the spirit or scope of this novel concept as defined by the following claims.

Having thus described typical embodiments of our invention, that which we claim as new and desire to secure by Letters Patent of the United States is:

1. An interconnecting device for electronic circuitry including:

a matrix having top and bottom surfaces;

a plurality of spaced parallel ridges in the top surface to define grooves therebetween;

a plurality of spaced notches in each ridge to define effectively aligned pyramids between the notches, each notch having a horizontal passage at the base thereof, each notch being less deep than the height of the ridges; and a plurality of slugs of a conductive material positioned in vertical recesses extending upwardly from the bottom surface of the board in vertical alignment with the notches, the ridges having vertical openings from the top communicating with the slugs and connecting with the notches the slugs terminating below the base of the notch, the slugs being penetrable by a wire or pin inserted therein and, making contact therewith.

2. A device as in claim 1 in which the slug is a conductive elastomer.

3. A device as in claim 1 in which the base of the notch has vertically arranged teeth projecting laterally from at least one side thereof.

4. A device as in claim 1 in which each slug is located in the board by a shoulder at the upper end of the recess at a point below the base of the associated notch.

5. An interconnecting device for circuit connectors or one or more electronic components including:

a dielectric matrix, a plurality of spaced parallel ridges on one side of the matrix having a plurality of spaced openings therein extending through the matrix, each ridge having notches therein connecting with the openings through the matrix and less deep than the height of the ridge, the notches in adjacent ridges being in alignment; and a slug located in each opening and extending from the surface of the matrix opposite to the ridges to a point below the base of the notches in the ridges, each slug being of a conductive material and of a texture to be pierced readily by connecting wires or pins used in electronic circuitry.

6. An interconnecting device as in claim 5 in which the slug is a conductive elastomer.

7. An interconnecting system as in claim 5 in which each opening has a shoulder therein below the base of the notch to engage with the upper end of the slug to locate the slug in selected position in the matrix.

8. An interconnecting system as in claim 5 in which the base of the notch is enlarged to form a horizontal passage, communicating with the notch to receive wires after the ends thereof are pierced into the slug.

9. An interconnecting system as in claim 5 in which the elastomer has a consistency to be pierced by and to receive and hold wires or pins inserted therein.

10. An interconnecting device for use in electronic circuit connectors or components supporting structures including:

a planar insulator board having parallel rows of holes therethrough to form a network in a selected pattern to accept the pins of components such as dual-in-line packages or pins of connectors said board having parallel ridges on one side extending along the rows of holes and corresponding in spacing to the rows of pins in a dual-in-line package, with the holes extending through the board, and with notches across the ridges intersecting the individual holes in the ridges and corresponding in spacing to the individual pin in a row of pins in a dual-in-line package, and conductive elastomer plugs in said holes, said elastomer having a consistency to receive wires or pins inserted therein and each plug terminating below the base of the notch intersected by the hole receiving the plug.

11. A device as in claim 10 in which the elastomer terminates short of one end of each hole, the hole receiving the plug having a shoulder between its ends to engage the end of the plug.

12. A device as in claim 11 in which the elastomer projects beyond the other end of the hole.

13. A device as in claim 10 in which the elastomer has the characteristic that the hole made by the wire or pin closes when the pin is withdrawn.

14. A device as in claim 10 in which the elastomer has the characteristic that the wire or pin, when inserted, is retained therein by the compression of the elastomer.

15. A device as in claim 10 in which the elastomer is so dimensioned as to retain itself in the hole.

16. A device as in claim 10 in which the elastomer is "self-healing" so as to close a hole therein when the wire or pin is withdrawn.

17. A pair of cooperating interconnecting devices each including:

a board having parallel rows of holes therethrough to form a network in a selected pattern to accept pins of components such as dual-in-line plugs, one side of said board having ridges coinciding with the rows of holes and notches in the ridges intersecting the holes and conductive elastomer plugs in said holes, said elastomer having a consistency to receive wires or pins inserted therein and in which the elastomer projects beyond the ends of the holes in the side of each board opposite to the ridges, such that, plugs in the pair of devices will mate when the devices are placed back-to-back and the plugs in the two devices are compressed when the devices are in contact for good electrical contact.

18. A pair of devices as in claim 17 in which each hole has a shoulder therein between its ends to engage the end of the plug and to locate the plug within the hole.

* * * * *